United States Patent
Fondrk

[11] Patent Number: 5,355,051
[45] Date of Patent: Oct. 11, 1994

[54] CRT BULB HAVING A FRONT PANEL WITH A HIGHER CTE THAN ITS FUNNEL

[75] Inventor: Mark T. Fondrk, Villa Park, Ill.

[73] Assignee: Zenith Electronics Corporation, Glenview, Ill.

[21] Appl. No.: 994,007

[22] Filed: Dec. 21, 1992

[51] Int. Cl.⁵ .................................................. H01J 31/00
[52] U.S. Cl. ................................. 313/477 R; 313/480; 220/2.3 A
[58] Field of Search ............. 313/477 R, 480; 445/45; 220/2.1 A, 2.3 A, 2.3 R; 501/15, 11

[56] References Cited

U.S. PATENT DOCUMENTS

| | | | |
|---|---|---|---|
| 4,614,892 | 9/1986 | Palac | 313/482 |
| 4,678,447 | 7/1987 | Prazak, III | 445/45 |
| 4,792,722 | 12/1988 | Francis | 313/477 R |
| 5,108,960 | 4/1992 | Boek et al. | 313/480 |
| 5,248,914 | 9/1993 | Capek et al. | 220/2.1 A |

FOREIGN PATENT DOCUMENTS

1-33831A  2/1989  Japan ............... 313/477 R

*Primary Examiner*—Donald J. Yusko
*Assistant Examiner*—Vip Patel
*Attorney, Agent, or Firm*—Roland W. Norris

[57] ABSTRACT

A CRT bulb is constructed from a front panel having a higher coefficient of thermal expansion than the funnel section to which it is rigidly attached, thereby favorably stressing the bulb in the funnel-to-panel seal area resulting in a bulb with adequate evacuated strength while utilizing a thinner front panel than otherwise possible.

14 Claims, 2 Drawing Sheets

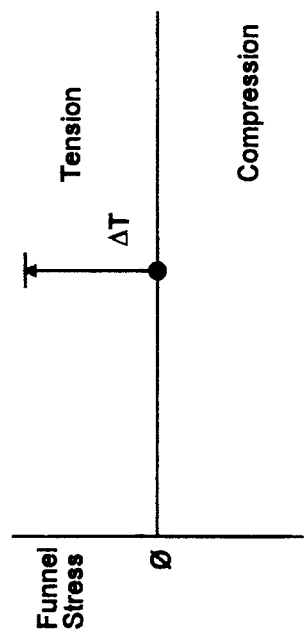
Fig. 2
PRIOR ART
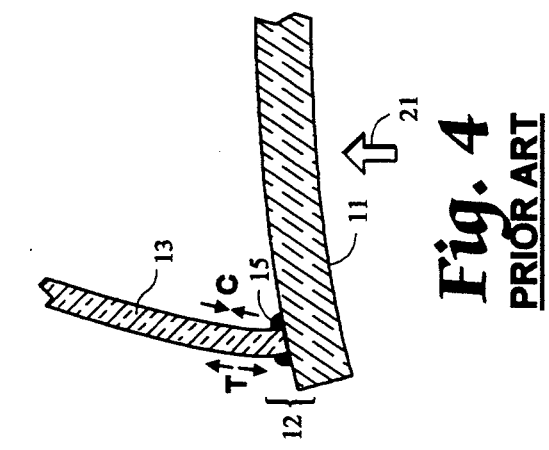
Fig. 4
PRIOR ART
Fig. 5
PRIOR ART
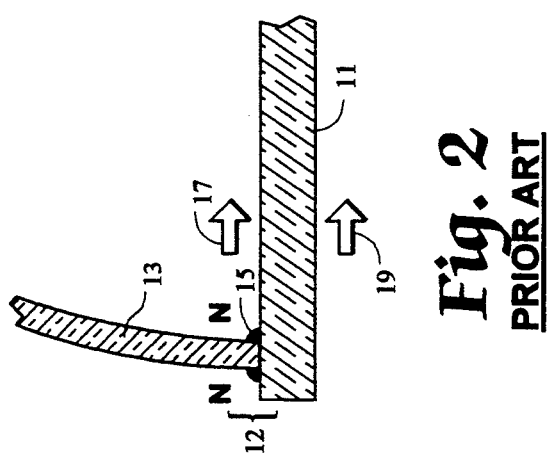
Fig. 6
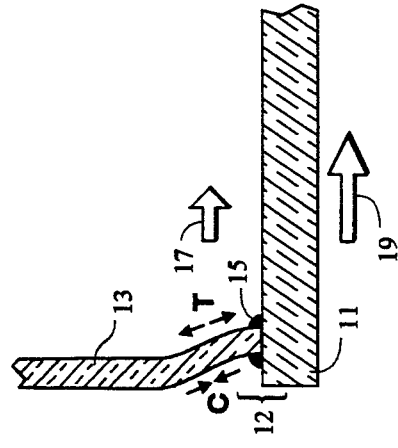
Fig. 7
Fig. 8

CRT BULB HAVING A FRONT PANEL WITH A HIGHER CTE THAN ITS FUNNEL

BACKGROUND OF THE INVENTION

1. Field of the Invention

The present invention relates generally to cathode ray tube (CRT) bulbs. More specifically, the present invention relates to CRT bulbs having flat front panels, or faceplates, suitable for use with flat tensioned shadow masks.

2. Discussion of the Related Art

As is known the art of CRT construction, a CRT "bulb" is formed from a screen-bearing front glass panel affixed at high temperatures to a glass funnel section with cementitious material, normally a devitrifiable solder glass, or "frit". A CRT "envelope" is then formed by sealing an electron gun into a neck section of the bulb opposite the screen. The CRT envelope is then evacuated and sealed to become an operational, or finished, CRT.

Because the CRT is evacuated, atmospheric pressure produces stress on the CRT envelope. Thus the CRT must be designed so that the weakest portion of its envelope is able to withstand this atmospheric loading. This ability to withstand atmospheric loading is referred to as the "pressure strength" of the bulb. Pressure strength is determined by a defacto industry standard test. Even though the external pressure after evacuation is approximately 14.7 psi; new bulbs are required to have a pressure strength greater than 14.7 psi in order to insure that they can survive a lifetime of environmentally induced damage The funnel-to-panel seal area, hereinafter "seal area", encompassing the funnel walls, frit, and panel areas adjacent each other, is a highly stressed area and therefore more likely to be an origin of failure; largely because large bending moments are typically generated in this area due to panel deflection.

In the common CRT spherical faceplate, the faceplate, being analogous to an arch, has a shape which inherently resists the atmospheric load on the CRT. However, in the case of a tensioned foil shadow mask CRT, which most commonly uses a flat front panel, the flat front panel shape does not inherently resist the atmospheric loading as well as a spherical panel.

As seen in FIG. 1, a known type of flat tension mask (FTM) CRT has a flat, skirtless, glass front panel 11 sealed to a glass funnel 13. The glass front panel 11 has a mask support structure 14 affixed on its interior surface 16. The mask support structure 14 surrounds a luminescent screen 18. Affixed under tension to the mask support structure 14 is a foil shadow mask 20.

As seen in FIG. 2, a flat skirtless glass front panel 11 is bonded to a glass funnel 13 by means of a devitrifying frit 15. The devitrifying frit 15 is applied to either the funnel 13 or front panel 11 at room temperature in the form of a paste. The front panel and funnel are then suitably fixtured together and traversed through a lehr, or oven, gradually bringing the temperature of the funnel and panel, i.e. the inchoate bulb, up to approximately 440° C. for a period of time sufficient to devitrify the frit. See FIG. 3 for a frit sealing cycle utilized for a common devitrifying frit denominated CV-685 and made by O-I/NEG Co. During sealing, the frit becomes rigid and crystalline at its "setting temperature", here 440° C., and remains so thereafter unless much higher temperatures are applied to it, thus sealing the funnel to the panel and forming a CRT bulb. The temperature of the bulb is then gradually reduced from the setting temperature back down to room temperature, 25° C., in order for further processing to take place.

As noted above, in conventional tube processing the coefficients of thermal expansion (CTE) are deliberately matched. In this case, as seen in FIG. 1, the CTE of the funnel 13 is represented in FIG. 1 by arrow 17 and the CTE of the faceplate or front panel 11 is represented by arrow 19.

Upon cooling of the bulb of FIG. 2, the residual stress in the bulb results in a neutral N, or minimally stressed, seal area 12. As seen in FIG. 4, upon evacuation, atmospheric pressure strains the seal area 12, which results in the funnel 13 being placed in tension, T, on the outside of the CRT and in compression, C, on the inside of the CRT. The area of the CRT placed in tension, i.e. the outside of the funnel 13 near the funnel-to-panel frit seal, is subject to environmental damage, e.g., scratches, bumps, etc. The flaws associated with this damage, because they are under tension and exposed to atmospheric moisture, will propagate over time. This is a well known phenomenon known as stress corrosion. The rate of flaw propagation is a function of the tensile stress at the flaw. If the stress level is high enough, the bulb may fail prematurely.

As graphically represented in FIGS. 2, 4 & 5 the vulnerable funnel area starts at neutral residual stress in the unevacuated envelope and upon evacuation due to panel-inflection-induced strain undergoes a stress change to place the vulnerable funnel area in tension.

In standard construction of the aforementioned flat front panel CRT, the flat front panel is connected by frit to a funnel to form a rigid bulb. Common practice in the art dictates that the coefficients of thermal expansion (CTEs) of the funnel and panel be closely matched so as to not create residual stresses caused by CTE mismatch in the bulb when it is cooled to room temperature. But, upon evacuation of the envelope, as the front panel deflects, large bending stresses will be placed on the frontal seal land area creating tension on the funnel and a potential source of CRT failure. In order to minimize the panel deflection and deflection-induced seal area stress, standard flat front panel CRT construction utilizes a thick glass for a stiffer front panel and a thick funnel seal land. The thick front panel will reduce deflection induced strains in the seal area and the thickened front seal land is incorporated into the funnel to further resist the remaining strain. However, in this arrangement, the thick front panel, being designed primarily for stiffness, is stressed well below its allowable limits and therefore represents wasted material in terms of envelope strength. The thickened bulb members add weight and attendant material, and increased panel and/or funnel manufacturing and CRT processing time and shipping costs to the CRT.

The problem of increasing panel weight/thickness has led the inventor to re-think the emphasis on residual stresses formed in the bulb as a result of funnel-to-panel sealing. Per the above discussion, in some cases it would be desirable to redistribute stress in the seal area of an evacuated CRT bulb to favor a thinner paneled bulb with strength equal to a bulb with a thicker panel.

OBJECTS OF THE INVENTION

It is among the objects of the invention to:

1) provide a CRT bulb which more efficiently distributed stresses among the bulb members to resist atmospheric loading stress on the evacuated CRT,
2) utilize front panel and funnel components having different coefficients of thermal expansion (CTE) in the bulb to obtain a bulb with a thinner front panel, but having evacuated strength equal to that obtained with current manufacturing techniques.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

FIG. 2 is a cross-section illustrating residual stresses in the bulb seal area of a known flat skirtless panel CRT after a funnel-to-panel sealing cycle.

FIG. 4 is a cross-section illustrating the seal area stress pattern of an evacuated CRT made from the bulb of FIG. 2.

FIG. 5 is a graph illustrating the tension on the outside of the funnel in the CRT of FIG. 4.

FIG. 6 is a cross-section illustrating residual stresses in the bulb seal area of a flat skirtless panel CRT according to the present invention after a funnel-to-panel sealing cycle.

FIG. 7 is a cross-section illustrating the seal area stress pattern of an evacuated CRT according to the present invention.

FIG. 8 is a graph illustrating the tension on the outside of the funnel in the CRT of the present invention.

DESCRIPTION OF THE PREFERRED EMBODIMENTS

As seen in FIG. 6, according to present invention, the CTE 19 of the front panel 11 is selected to be greater than the CTE 17 of the funnel 13. The residual stresses in the bulb after the frit sealing cycle thus places the vulnerable outer portion of the funnel 13 in compression C.

As seen in FIG. 7, upon evacuation, atmospheric pressure strains the seal area 12 bringing the vulnerable funnel area through neutral stress and bringing it slightly into tension, as illustrated graphically in FIG. 8. Because the vulnerable funnel area is under less tension the evacuated CRT will have greater pressure strength than a conventionally sealed bulb with the same panel thickness.

While it is noted that there are a variety of CTEs published for television type funnel and panel glasses, only the relative CTE values from 25°–440° C., i.e. the temperatures which the panel and funnel actually undergo during the sealing operation are important. In the case of the aforementioned devitrifying frit, the CTE values over the sealing cycle from 25°–440° C. and back down to 25° C. are needed, whereas other types of frit requiring different sealing cycles require individual determinations of CTE values for their specific sealing cycles. In the preferred embodiment, the panel and funnel glass are subjected not only to pure CTE effects, but also the effects of structural relaxation or compaction and stress relaxation. The magnitude of the residual stress in the bulb resulting from the sealing cycle is thus a function of sealing cycle duration, temperature, as well as the relative CTEs of the funnel and panel components.

Because it is difficult to separate pure CTE effects from compaction effects the term "effective CTE" will be used herein to take into account these effects. In general, the effective CTE may be defined as the shrinkage from the sealing cycle highest, or plateau, temperature down to room temperature, divided by this temperature range.

Thus, the effective CTE values for the panel and funnel glasses over the temperature range and sealing cycle actually used in bulb manufacture must be determined in order to practice the present invention. Glass CTE values are controlled by varying the glass composition at the time of manufacture. The effective CTE values for a given sealing cycle may be obtained by fritting together two or more pieces of glass in the same thermal cycle that would be used for bulb sealing. The stress on each piece of glass is read with a polarimeter and a correlation factor is used to determine the relative CTE between the two glasses. To derive an absolute value of CTE, the CTE of one of the pieces of glass must be known. Since the specimens go through an actual sealing cycle, the effects of structural relaxation are accounted for.

Figure 1:
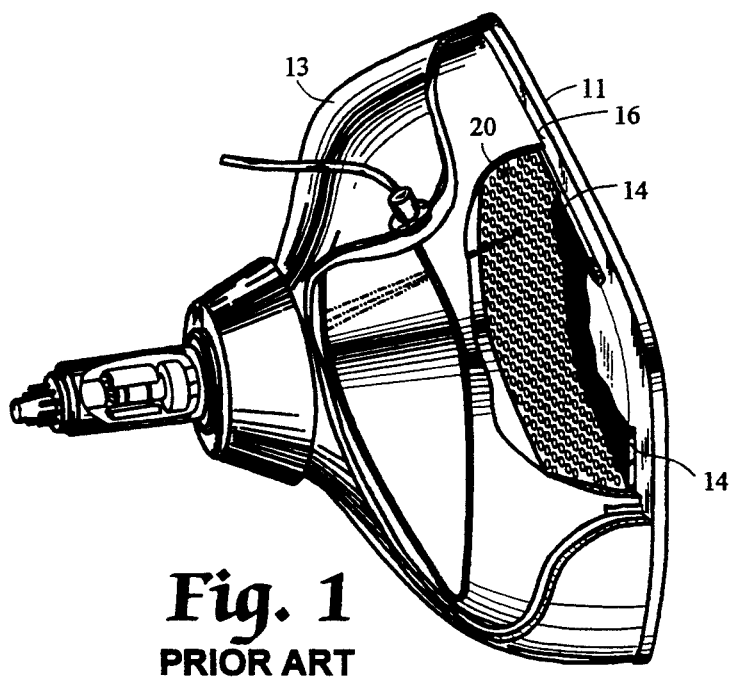
FIG. 1 is a cut-away perspective view of a known type of operational flat tension mask type color CRT.
Figure 3:
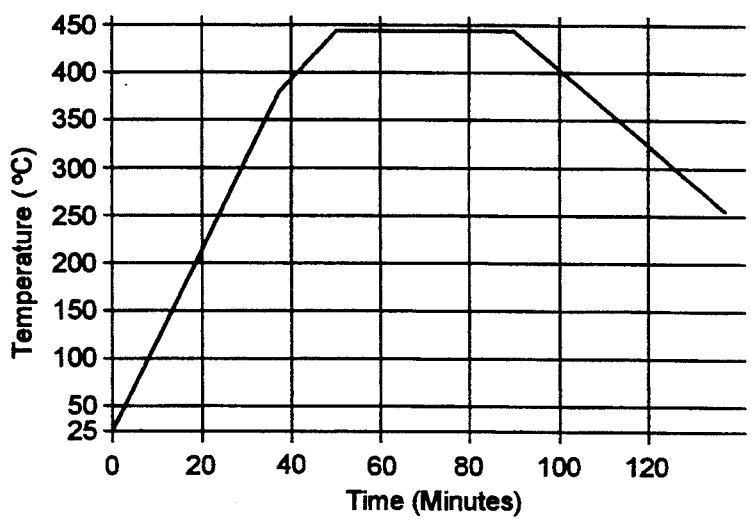
FIG. 3 is a graph of a sealing cycle used in the manufacture of the bulb of FIG. 2.
Figure 9:
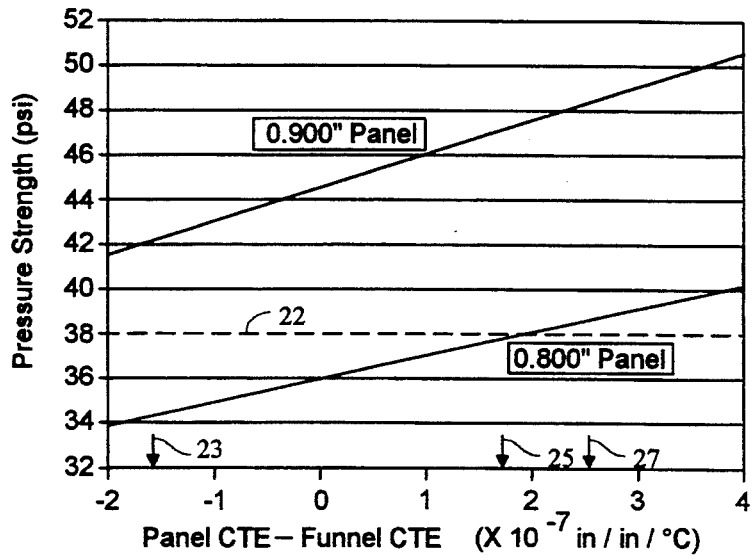
FIG. 9 is a graph of flat skirtless panel CRT pressure strength as a function of the CTE difference between the panel and the funnel illustrating the merits of the present invention.

As seen in FIG. 9, a plot of pressure strength against panel minus funnel CTE difference for a nine hundredths inch flat skirtless panel and an eight hundredths inch flat skirtless panel each using three different combinations of panel and funnel CTE mismatches 23, 25, 27 shows that where the value of the effective CTE of the panel is greater than that of the effective value of the funnel, the greater the evacuated bulb pressure strength will be for a given thickness of front panel. The Electronics Industry Association, or EIA, JT-32 Bulb Strength Task Force recommendation for evacuated CRTs is at least 38 psi, as indicated by the dashed horizontal line 22. Thus, where panel weight considerations are paramount in the design of the CRT, a thinner panel having a CTE higher than the CTE of the funnel may be utilized.

While the present invention has been illustrated and described in connection with the preferred embodiments, it is not to be limited to the particular structure shown, because many variations thereof will be evident to one skilled in the art and are intended to be encompassed in the present invention as set forth in the following claims: For example, a bulb having a skirted faceplate will also derive favorable residual stress distribution according to the present invention in the corners of the faceplate where the skirt joins to the panel.

Having thus described the invention:

What is claimed is:

1. In a cathode ray tube bulb made by sealing a glass front panel to a funnel by cementing said panel and said funnel together with solder glass at predetermined elevated temperatures over a predetermined time and temperature sealing cycle, whereby a substantially rigid hermetic panel-to-funnel seal is formed and thereafter lowering the sealed bulb to room temperature; the improvement comprising:

the front panel having an effective co-efficient of thermal expansion (CTE), over a temperature range from room temperature to the setting temperature of the sealant, which is greater than the effective CTE of the funnel over that temperature range, whereby residual stresses in the sealed bulb are distributed so as to produce a bulb with good evacuated pressure strength.

2. The cathode ray tube bulb according to claim 1 wherein the glass panel is flat and skirtless.

3. The CRT bulb according to claim 2 wherein the CTE of the panel glass is approximately $2 \times 10^{-7}$ inch/inch/° C. or more higher than the CTE of the funnel.

4. The CRT bulb of claim 1 wherein the funnel is glass.

5. The CRT bulb of claim 1 wherein the solder glass is a devitrifying frit.

6. The CRT bulb of claim 5 wherein the devitrifying frit has setting temperature of approximately 440° C.

7. The CRT bulb of claim 6 wherein the sealing cycle is as follows:
25° C.–375° C. at a rise rate of 6°–11° C. per minute,
375° C.–440° C. at a rise rate of about 3°–6° C. per minute,
440° C. held for about 35–45 minutes,
cooling to 250° C. at 2.5–7° C. per minute.

8. In a cathode ray tube bulb made by sealing a glass front panel to a glass funnel by cementing said panel and said funnel together at predetermined elevated temperatures with devritrying solder glass whereby a rigid hermetic panel-to-funnel seal is formed and thereafter lowering the sealed bulb to room temperature; the improvement comprising:

the front panel having an effective coefficient of thermal expansion (CTE), over a temperature range from room temperature to the setting temperature of the sealant, which is greater than the effective CTE of the funnel over that temperature range.

9. The CRT bulb of claim 8 wherein the glass panel is skirtless.

10. The CRT bulb of claim 8 wherein the CTE of the panel is about $2 \times 10^{-7}$ inch/inch/° C. or more higher than the CTE of the funnel.

11. The CRT bulb of claim 8 wherein the sealing cycle is as follows:
25° C.–375° C. at a rise rate of 6°–11° C. per minute,
375° C.–440° C. at a rise rate of about 3°–6° C. per minute,
440° C. held for about 35–45 minutes,
cooling to 250° C. at 2.5 to 7° C. per minute.

12. In a cathode ray tube bulb having a flat glass front panel with: a shadow mask support structure affixed thereto, a fluorescent screen bounded by the mask support structure, and a tensed foil shadow mask attached to the mask support structure; and a glass funnel affixed to the front panel by a rigid devitrifying solder glass, the improvement comprising:

the front panel having an effective coefficient of thermal expansion (CTE) over a temperature range from room temperature to the setting temperature of the sealant, which is greater than the effective CTE of the funnel over that temperature range, whereby residual stress is distributed in the resultant bulb, so as to create a CRT having good evacuated pressure strength.

13. The cathode ray tube bulb of claim 12 wherein the CTE of the panel is greater than or equal to $2 \times 10^{-7}$ inch/inch/° C. higher than the CTE of the funnel.

14. The CRT bulb of claim 12 wherein the sealing cycle is as follows:
25° C.–375° C. at a rise rate of 6°–11° C. per minute,
375° C.–440° C. at a rise rate of about 3°–6° C. per minute,
440° C. held for about 35–45 minutes,
cooling to 250° C. at 2.5 to 7° C. per minute.

* * * * *